United States Patent
Daly

(12) 
(10) Patent No.: US 8,864,562 B2
(45) Date of Patent: Oct. 21, 2014

(54) ONLINE POLITICAL PREDICTION GAME

(75) Inventor: Patrick D. Daly, Prairie Village, KS (US)

(73) Assignee: Patrick Daly, Naperville, IL (US)

(*) Notice: Subject to any disclaimer, the term of this patent is extended or adjusted under 35 U.S.C. 154(b) by 58 days.

(21) Appl. No.: 13/329,292

(22) Filed: Dec. 18, 2011

(65) Prior Publication Data
US 2013/0157737 A1    Jun. 20, 2013

(51) Int. Cl.
*A63F 9/24* (2006.01)

(52) U.S. Cl.
USPC .................................................. 463/9; 463/21

(58) Field of Classification Search
USPC .................. 463/9, 17–21, 40, 42; 235/51–56; 434/306; 273/257, 279
See application file for complete search history.

(56) References Cited

U.S. PATENT DOCUMENTS

| | | | |
|---|---|---|---|
| 8,265,544 B1* | 9/2012 | Dungy | 434/362 |
| 2002/0029163 A1* | 3/2002 | Joao | 705/12 |
| 2009/0186679 A1* | 7/2009 | Irvine et al. | 463/16 |
| 2012/0174145 A1* | 7/2012 | Frazier et al. | 725/14 |

OTHER PUBLICATIONS

The website http://tippie.uiowa.edu/iem as evidenced by Berg, Joyce, et al. "Results from a dozen years of election futures markets research." Handbook of experimental economics results 1 (2008): 742-751, book chapter downloaded from http://tippie.uiowa.edu/iem/archive/bfnr_2000.pdf by USPTO on May 10, 2013.*
University of Iowa, the "markets" web page http://tippie.uiowa.edu/iem/markets/ downloaded from http://web.archive.org/web/20100922172817/http://tippie.uiowa.edu/iem/markets/ with an archive.org reported date of Sep. 22, 2010.*

* cited by examiner

*Primary Examiner* — Pierre E Elisca

(57) ABSTRACT

This is a method and system for a computerized online apparatus allowing users to engage in political prediction games based on contemporary American elections at the presidential, congressional, state, and local level, assigning points based on the results from the actual political election contests, the user's predictive accuracy relative to the actual outcomes and results of those aforementioned elections, and by comparing the user's predictive success relative to other users.

22 Claims, 3 Drawing Sheets

ONLINE POLITICAL PREDICTION GAME

BACKGROUND

1. Field

This application is directed at a method and system for a computerized online apparatus allowing users to engage in political prediction games based on contemporary American elections at the presidential, congressional, state, and local level, assigning points based on the results from the actual political election contests, the user's predictive accuracy relative to the actual outcomes and results of those aforementioned elections, and by comparing the user's predictive success relative to other users.

2. Prior Art

An estimated 32 million Americans currently participate in some form of fantasy sports competition, which involves a player competing against other players based on real-life statistics generated by the actual athletes and teams of a professional or collegiate sport. Every March, countless individuals test their predictive abilities by filling out upwards of 40 million brackets in the days leading up to the men's NCAA basketball tournament. Virtually every large scale sports website of distinction offers some menagerie of fantasy sports games—fantasy football, rotisserie baseball, pick'em games—to its customers, who tend to be employed full-time, college educated, and with household incomes in excess of $60,000 a year. The economic impact of fantasy games to the sports industry as a whole has been estimated at upwards of $3 billion annually.

While fantasy sports is now a multi-billion dollar industry that affects the very manner in which these sports are presented and reported, this was not always the case. Early manifestations of fantasy games that were based on real life sports were largely informal, usually made up of groups of people who would assemble Major League Baseball rosters that competed based on the assembled players' final standings in batting average, ("RBI"), earned run average ("ERA"), and wins. The American Professional Baseball Association ("APBA") and the Strat-O-Matic were commercial sports simulations that employed this system, which were limited in that they relied on a player's performance from the year before to play the games. New systems evolved, most notably one credited to magazine writer David Okrent who, while meeting with like-minded baseball fans at the La Francoise Rotisserie restaurant in New York City, came up with the idea of awarding points based on statistics developed during and in the course of the season. This use of actual, contemporaneous statistics within an active season was a departure from the previous forms of fantasy games, which typically relied on the statistics from the past season. These types of games were eventually applied to other sports, including football, basketball, and hockey.

Advances in technology and the growth of the Internet over the last decade vastly expanded the scale, scope, and breadth of fantasy games. The popularity and relevancy of professional and collegiate sports, particularly football, has been augmented by these competitive leagues. Whereas in years past the average sports fan may have only cared to watch his or her favorite team or the top matchups, fantasy football now gives the viewer a rooting interest in virtually every game on the schedule—even the bad ones. The massive popularity of fantasy games has changed the way in which sports are reported and televised, as evidenced by the hundreds of fantasy sports-related websites, the numerous hours of television broadcasts involving the injury updates and statistical performance of particular players, and the omnipresent tickers which display in-game, real-time stats for various players during live sports broadcasts.

The American political process is the only other phenomenon that can rival collegiate and professional sports in terms of sustained viewership, media attention, and the zealous participation of its followers. The enthusiasm and excitement surrounding collegiate and professional sports is at times matched, and in many cases surpassed, by the passion many have in following and participating in the American political process. By virtually any metric, American politics performs as well as professional sports in terms of its visibility and engagement with the American people. On one single day, Nov. 4, 2008, more than 131 million Americans (all over the age of 18) voted in the presidential election, which roughly equals the combined total attendance numbers for the entire 2010-2011 seasons for every major professional American sport (MLB, NFL, NBA, and NHL). The Center for Responsive Politics estimates that the 2012 elections will be fueled by more than $6 billion in spending, which is comparable to the estimated $6.6 billion that was spent on sports-related advertising and marketing in 2010 by the top advertising companies.

American politics is even able to compete favorably with professional sports in terms of television viewership. In 2011, the NFL and CBS set conference championship ratings records with 54.8 million people watching the AFC Championship game, which would be a below-average viewership for a presidential debate (which have pulled in excess of sixty million viewers numerous times). More people watched the Oct. 26, 1980 presidential debate between Ronald Reagan and Jimmy Carter (80.6 million) than watched Super Bowl XV the following January (68.2 million) or the series finales of Seinfeld (76.3 million) and Cheers (80.4 million), both of which are regarded as two of the most-watched single episodes in American television history. The opening ceremonies for the 2008 Summer Olympics in Beijing was watched by nearly 70 million Americans, a television audience matched a few months later by the vice-presidential debate between Sarah Palin and Joe Biden. The television viewership for the 2008 vice presidential debate is also comparable to the number of people (70.6 million) that went to a movie theater to see 2008's The Dark Knight, regarded as one of the highest grossing movies of all time.

Until now, no suitable or reliable scoring system or method in a structured, competitive format existed to award points based on political election results. Unlike collegiate and professional sports, which have scheduled games that occur with relative frequency, political elections occur at various times throughout the year, varying from office to office, state to state, and cycle to cycle. Moreover, each state usually has no more than three elections per cycle (a presidential preference primary or caucus, a general state primary, followed by the general election in November). While most are aligned with the two-year general and presidential election schedule, some states' elections occur in off-season or odd-numbered years. Some races are contested, whereas others are forced into runoff elections. Polling is expensive and largely subjective, and its public availability is dependent on the budgets and the whims of local news organizations. Aside from the final vote totals and eventual Election Day wins or losses, there are few reliable objective criteria to be used as a basis for statistical analysis and scoring.

Scheduling and managing a competitive game, particularly during the presidential primary, is particularly challenging. There are no uniform standards from state to state in terms of how delegates are chosen and assigned. In fact, for the 2012

Republican primary season there are upwards of a dozen different methods employed by the states to select their delegates for the nomination process. Putting aside the manner in which these delegates are chosen and distributed, there is also a wide array of methods employed to hold the primary contests: some take the form of a primary election, caucuses, conventions, or a combination of these methods. In addition, the scheduling of these events is often in flux in the months leading up to the primary season. Using a recent example, numerous states attempted to move ahead of one another in the lead-up to the 2012 Republican presidential primary season, setting off a series of chain reactions that affected the primary and caucus scheduling of dozens of states.

Fashioning an engaging and compelling game is also complicated by various candidates' decisions whether or not to enter a race and—if these candidates chose to formally enter the race—how long they will sustain their campaigns until ultimately withdrawing. Some nominations have been informally wrapped up after a few contests, whereas others have continued well into the calendar without a nominee being decided upon. Some incumbents enjoy a primary without any competition, whereas others are challenged. While nominations are not actually formalized until the nominating conventions in late summer, many presumptive nominees have been decided upon months before the convention. This uncertain duration makes it particularly difficult to schedule any "head to head" contests or a playoff structure as traditionally employed in fantasy leagues.

OBJECTS AND ADVANTAGES

This application resolves those obstacles to applying a fantasy and pick'em game architecture to the contemporary American political system by utilizing several objects and advantages of the present invention, including providing for a method and system by which:

a) objective election criteria, such as election results, total votes, vote percentage, delegates awarded, wins, losses, and relative ranking, are distilled into a simplified and intuitive point system;

b) where the disparate and infrequent election dates are organized within a "week" structure, whereby the organizer and user are able to conceptually organize the season within discrete weeks in an election season rather than fifty separate election contests occurring on various dates over the course of many months;

c) where the user can engage in an ongoing, continuous competition with other users until the primaries are no longer formally contested, obviating the inherent scheduling difficulties given the uncertain nature as to the duration of the primary;

d) for the presidential primary nomination, users are not confined by having to draft among the limited number of declared presidential candidates, but rather are able predict the eventual result and final ranking for each of the primary elections or caucuses during the presidential primary;

e) for the general state primaries, the users may employ the prediction pick'em method or, since users are able to make predictions in a more stable and consistent manner, may implement a traditional fantasy game architecture which would allow for the playoff system or head-to-head competitions.

f) for the general election in November, the same operative point system may be applied relative to the presidential, congressional, state and local offices up for election on Election Day in November.

Further objects and advantages are intended to provide a supplement to the user in playing the game. Many of these additional objects and advantages are non-predictive in nature, but enhance the central function of this invention, such as providing very topical news stories and social media enhancements to the content-rich assets within the website architecture.

Many sociologists suggest that people enjoy playing fantasy sports and prediction games (such as filling out "March Madness" brackets because it gives that person an added level of engagement with their favorite sports. Due to the nature of the competition, a player of these games is motivated—and often rewarded—for additional research into the intricacies and tendencies of certain athletes and teams. More competitive fantasy football players will often investigate NFL team depth charts while drafting in later rounds, hoping to pick up an obscure 'diamond in the rough' player that may emerge as a productive scorer if the team's injury-prone starter gets hurt; "March Madness" enthusiasts may analyze the men's basketball teams' home and away records when trying to decide which team to pick as the winner in a 7 to 10 matchup on their bracket.

Users seeking a competitive advantage over their opponents may find themselves researching the political trends and local peculiarities of states that they had never cared about before, or fashioning their own methodologies to determine the relative strengths of the various political campaigns. By formulating a similar competition with the ongoing elections, it is likely that the users of this invention will find themselves becoming more educated and informed voters as it relates to these elections, which is a considerable societal benefit to all of us and our country as a whole.

SUMMARY

The present application is directed at a computerized online political prediction apparatus of and methodology for making predictions for various elections, and scoring these picks based upon the actual results from these elections. This present application takes its inspiration from the architecture used in traditional fantasy sports games, such as fantasy football and pick'em leagues, and applies it to contemporary American political elections.

The initial step of this invention is a method by which the player establishes an online profile, where the player identifies the desired username, team name, associated avatar picture, home state and/or zip code (or, an international designation), their political beliefs, and the particular candidates the user is either supporting or believes will ultimately win.

After the team is created, the user may then access the website and view the user's account information, including team avatar and name; current points and win percentage; and relative ranking as compared to other players. This initial page also contains various leaderboards related to the user's overall ranking and the user's ranking as compared to other users supporting the same candidates.

As the game progresses, the user is directed to enter their predictions based on the scheduled elections for that given week. The user continues to do this so long as the elections remain contested and there are upcoming races.

DRAWINGS

Figures

DRAWINGS

Figure 1:
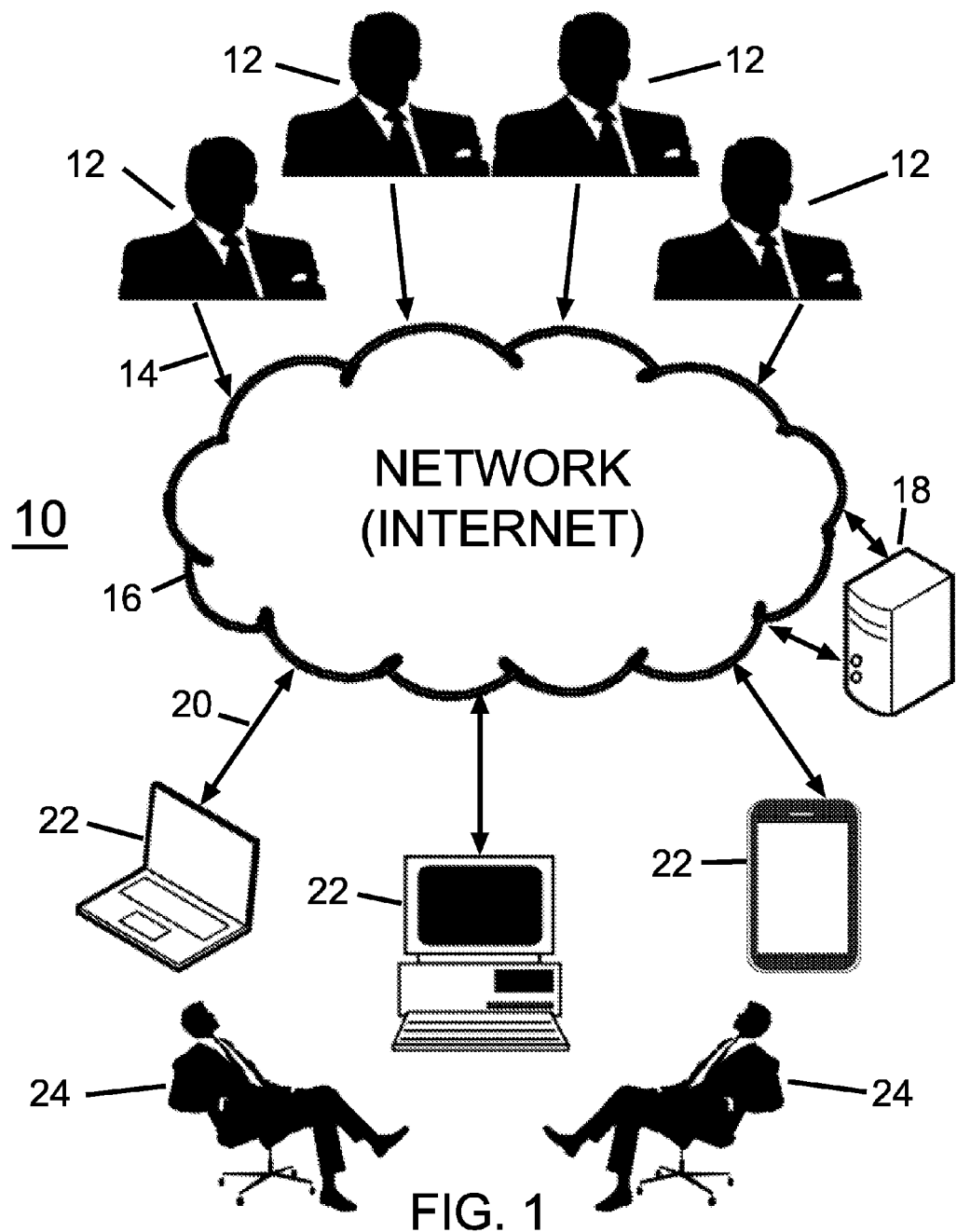
FIG. 1 is a block diagram illustrating an exemplary system, in accordance with one embodiment of the present application.

Reference Numerals 10 networked system to transmit political data
12 political results
14 transmission of political election results data to Internet
16 Internet
18 server
20 transmission of data between Internet and participant terminals
22 participant terminals
24 user of system
30 method of user interaction with described system
32 register/sign-in introduction page
34 determination whether user is existing user or new user
36 new user registration
38 returning user log-in
40 user account access
42 prediction entry
44 calculation of candidate's total points
46 calculation of team score
48 recognition of users based on total score and prediction accuracy
50 team name
52 user name
54 password
56 state
58 political affiliation
60 preferred candidate
62 winning candidate
64 avatar selection

DETAILED DESCRIPTION

Figure 2:
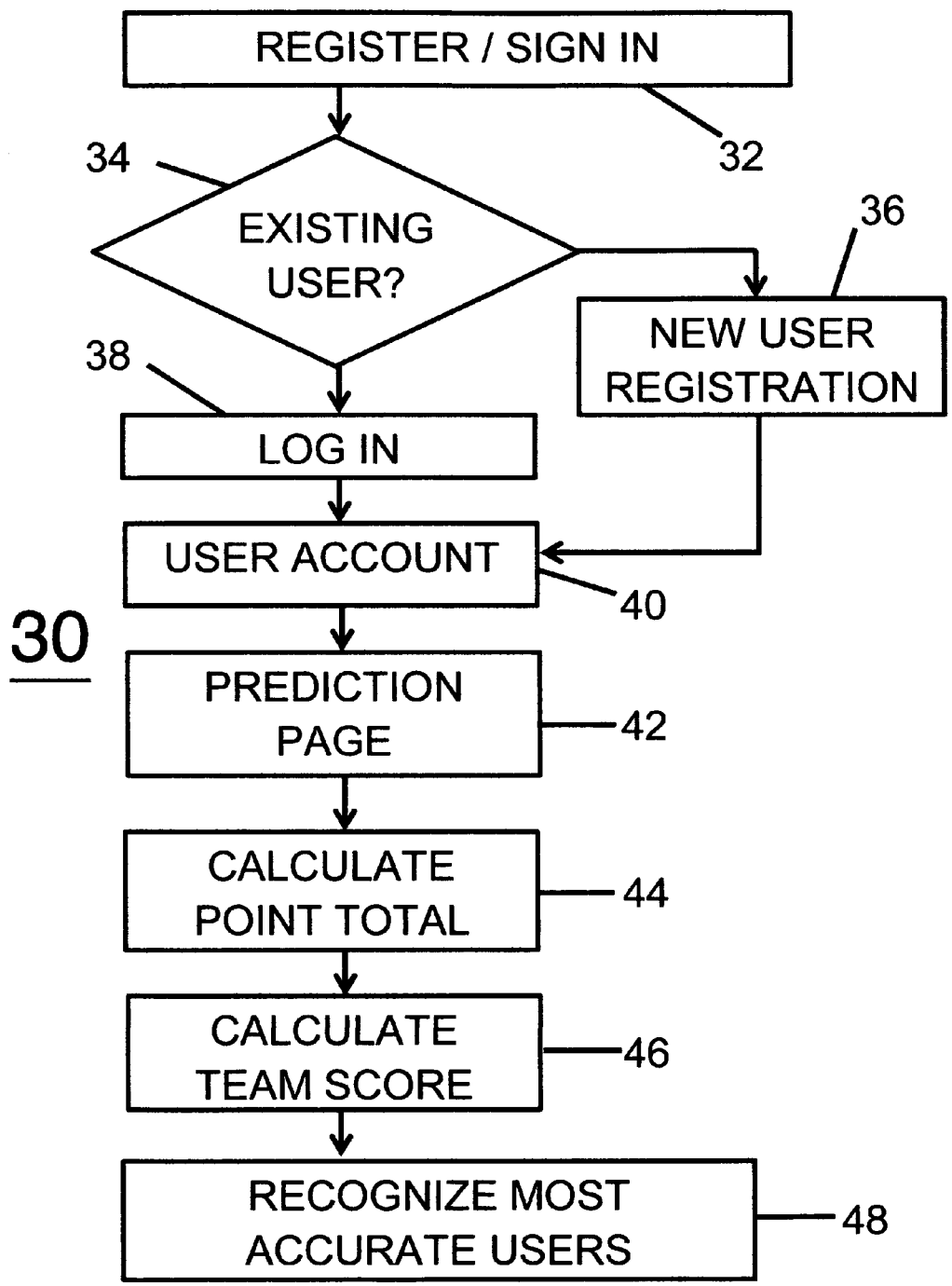
FIG. 2 is a flow diagram of an illustrative process for an example of the game play in accordance with one embodiment of the present application.

FIGS. 1 and 2—First Embodiment

The present described application may be embodied in various forms, however, and therefore specific details disclosed herein are not to be interpreted as limiting, but instead as a representative basis for describing one method used to execute the present application.

FIG. 1 is a block diagram illustrating an exemplary system for conducting an online political prediction game 10, in accordance with numerous embodiments of the present application. This system and method utilizes political candidates as the subjects in this game, and any and all presidential, congressional, state or local candidates are considered within the scope of this application. The performance and results of multiple candidates 12 in an individual election or series of elections are collected, and the election outcomes are transmitted 14 to and accumulated on a server 18 via automatic or manual input. In this illustration in FIG. 1, the transmission is shown across a network; specifically, the Internet 16. The users 24 in this example are utilizing participant terminals 22, which could encompass their personal computers, cellular telephones, mobile devices, and any other Internet-accessible device (collectively 22) to join in the game run on the server 120. During and at the end of the play period, the software running on the server is utilized to rank the respective teams in the league leaderboards. As these games are web-based, it will be utilizing web browsers running on the user's computers or other Internet accessible devices (collectively 22) to communicate 20 across the Internet 16 with the games running as a web or web server application on the server 18. Other interfaces and system architectures, including but not limited to mobile applications, are also within the scope of the present application.

The participant terminals 22 may include any suitable device operable to act as a client on a network. Illustrative terminals 22 include, but are not limited to, personal computers, desktop computers, laptop computers, servers, or any suitable telecommunications device, including, but not limited to: VoIP telephones, smart telephones or wireless devices, such as cellular telephones, personal digital assistants, communications-enabled MP3 players, tablet devices, and any other Internet 16 accessible device. Each participant terminal 22 may be configured to transmit and/or receive information to and/or from the server 18 the political results information source 12, and/or other participant terminals 22.

The server 18 may be any server, computer, cloud-based network or application platform, or any device configured to process commands from the participant terminals 22. The server 18 may also be configured to receive statistical information from the political results source 12. Once the server 18 has received the relevant political results information from the political results source 12, the server 18 may calculate the user-player's point total for each candidate and/or election outcome.

In the illustrative embodiment and others, the server 18 includes a memory and a processor to accommodate the forgoing processes and applications. However, it is anticipated that the illustrative embodiments and others may be implemented in hardware, software, and any suitable combination thereof, and which can be one or more software operating systems or applications operating on multiple platforms. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application. Alternatively, the functions of the server 18 may be performed by a human user acting as the game's commissioner for the purposes of these competitions.

The previous and following description is based on the exemplary embodiment which will be implemented in the experimental Internet website www.PickEm.us, which was developed by the Applicant. However, one skilled in the art will recognize that the present application is equally applicable to other formats and websites, and therefore this description contained here is to be considered only exemplary and non-limiting.

The first embodiment of the present application conducts a political pick'em game based on the series of presidential primary elections and caucuses, which is done by scoring and comparing a user's selections with the targeted election outcomes. The present application involves the creation of a team, where the user specifies their desired username, team name, pre-selected visual avatar, home state, political leanings, preferred candidate, and the candidate the player believes will ultimately win. Once the user's team is created, the user may then make their picks on a week-by-week basis, which entails the user ranking the candidates based on the user's predictions regarding the ultimate outcome of the vote.

Referring now to FIG. 2, there is shown a flowchart 30 illustrating an example of the game play in accordance with one embodiment of the present application. In this illustration, the prospective user calls up the host website for the political pick'em game, and is greeted with a sign-in/registration page (step 32). Depending on whether the user has already established an account, the user has the option (step 34) of proceeding as a new user and registering (step 36), or, if the user has already created a team, may log in to the website (step 38) and proceed to the team account page (step 40). Also, in this embodiment and others, these registration options may take place through mobile applications or via third-party resources such as Facebook.

Figure 3:
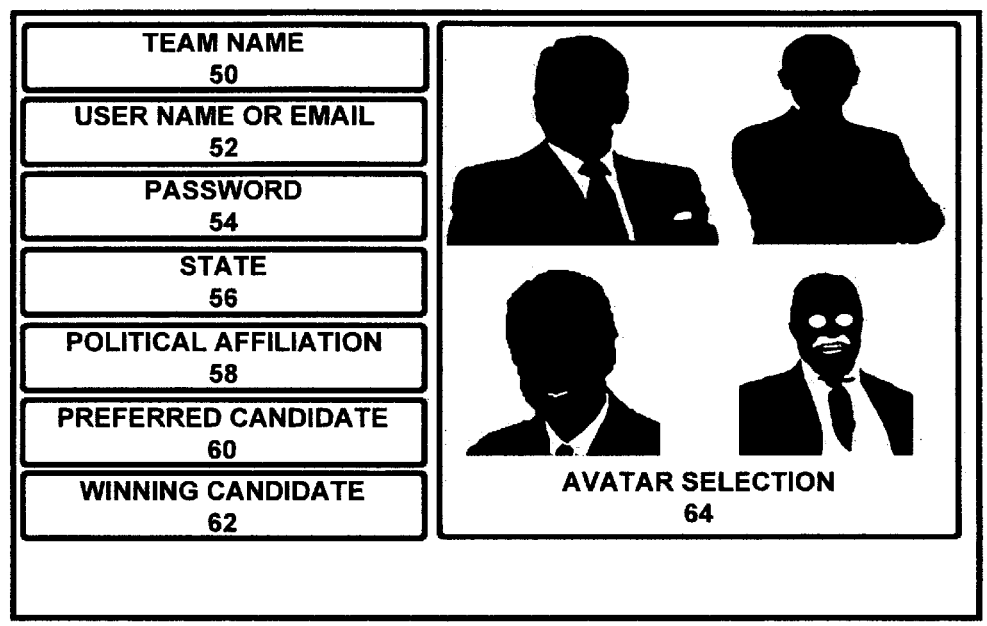
FIG. 3 is a block diagram of an illustrative process for the user registration page in one embodiment of the present application.

Operation—FIG. 3

In a first step 32 of the presidential pick'em method 30 as displayed in this embodiment, the user accesses a dedicated website, which provides the user with the options of either registering as a new player, or selecting an option as a returning player. An example of these options presented to the user is identified by reference 50 in FIG. 3, in which the prospective user is welcomed with a view of the game's logo, followed by two distinct options: registering a new account as a "New Player," or logging in as a "Returning Player" to check their score and made additional predictions. This example in FIG. 3 also presents to the prospective user various text and graphic images which briefly summarize the nature and process of the game in very basic terms.

Assuming the prospective user is a "New Player," the user is directed (reference numeral 34 in FIG. 2) to register a team (reference numeral 36 in FIG. 2). In one embodiment of the present application, the prospective player has indicated that he or she wishes to sign up a team to play the game. By electing to sign up and create an account with the website, the user is required to provide basic registration information, such as a desired team name, primary email address, home state, and password. In addition, the user is asked to choose among the following pre-selected options: a team avatar (representing various figures and icons throughout American political history), personal political affiliation, desired winning candidate in the 2012 presidential election, and the candidate that they believe will ultimately win the Republican nomination for president. An example of such a new user profile registration is identified in FIG. 4.

Alternatively, as demonstrated in step 34 of method 30, a user may have previously created a registration with the server. In that case, the user may opt for the "Returning Player" option, where the user is then directed to the user login page (reference numeral 38 in FIG. 2). In this next step 40 of method 30 in FIG. 2, and upon registration or returning as a previously registered user, the user is then directed to the user's main account page.

Once logged in, the user is presented with specific information relating to the account created upon registration. This specific information may display the selected team name, total score, their political affiliation and candidates they believe will be successful, as well as the respective ranking within those stated preferences. In addition, there are options to access the pages for the specific weeks, which allow the user to make their selections for any contests occurring during that week. This particular web page would also display leaderboards, based on overall ranking and the user's preferred candidate.

Once an account has been created, the user is then able to directly access a given election contest. Once a particular election contest is selected, the user is then able to able make their prediction picks for the given election contest in accordance with the present application. Depending on the date the page is accessed, the page either displays the player's score for the given games (if the election has already occurred) or allows for the option of designating the ultimate ranking for the candidates in the offered elections. Statistics relative to the choices made by other players are also displayed to the user.

These election contests—primary elections or caucuses—are conceptually organized within a week-by-week structure. Table 1 provides an illustration of the week-by-week organizational schedule for one embodiment of this application. Specifically, this table shows the chronological schedule of the various primary elections and caucuses throughout the 2012 Republican presidential nomination process.

TABLE 1

Week-by-Week Organizational Schedule for Presidential Pick'Em League Matchups during 2012 Republican Primary

| Week | Dates | States | Delegates |
|---|---|---|---|
| 1 | Jan. 1-9 | Iowa | 28 |
| 2 | Jan. 10-16 | New Hampshire | 12 |
| 3 | Jan. 17-23 | South Carolina | 25 |
| 4 | Jan. 31-Feb. 6 | Florida, Nevada, Maine | 102 |
| 5 | Feb. 7-13 | Colorado, Minnesota, Missouri | 76 |
| 6 | Feb. 28-Mar. 5 | Arizona, Michigan, Washington | 102 |
| 7 | Mar. 6-12 | Alaska, Georgia, Idaho, Massachusetts, North Dakota, Oklahoma, Tennessee, Texas, Vermont, Virginia, Wyoming, Kansas | 596 |
| 8 | Mar. 13-19 | Alabama, Hawaii, Mississippi | 162 |
| 9 | Mar. 20-26 | Illinois, Louisiana | 115 |
| 10 | Apr. 3-9 | District of Columbia, Maryland, Wisconsin | 98 |
| 11 | Apr. 24-30 | Connecticut, Delaware, New York, Pennsylvania, Rhode Island | 231 |
| 12 | May 8-14 | Indiana, North Carolina, West Virginia | 132 |
| 13 | May 15-21 | Nebraska, Oregon | 64 |
| 14 | May 22-28 | Alaska, Kentucky | 81 |
| 15 | Jun. 5-11 | California, Montana, New Jersey, New Mexico, South Dakota | 299 |
| 16 | Jun. 12-18 | Ohio | 66 |
| 17 | Jun. 26-Jul. 2 | Utah | 40 |
|  | Aug. 27-30 | 2012 RNC Convention |  |

The user is directed to make predictions relative to the anticipated final outcome of a particular election contest. Once those votes are final, the user's predictions are then compared to the actual election outcome, and points are then awarded based on the basic scoring mechanism outlined below in Table 2 ("Political Pick'Em Point System").

The point system employed by this present application awards points based on the following allocation system:
  the user is awarded one (1) point for every 10,000 votes the candidate earns;

the user is awarded one (1) point for every 10% of the vote the candidate earns;

the user is awarded one (1) point for every one delegate the candidate may earn at that contest, and;

the user is awarded one (1) point as a bonus for correctly guessing the placement, regardless as to whether the candidate won sufficient votes, vote percentage, or delegates to justify other points.

TABLE 2

Political Pick'Eem Point System

| Category | Event | Points Awarded |
|---|---|---|
| Voting | Every 10,000 votes | 1 |
| Vote Percentage | Every 10% | 1 |
| Delegate Apportionment | Each delegate earned | 1 |
| Wins and Losses | Correctly picking a candidates' placement in a given election | 1 |

In this embodiment, however, these points are only awarded to the user if the user accurately and correctly predicts the final ranking for the respective candidates in a given primary or caucus.

Alternatively, another embodiment of this system and method may apply the point system above based on the user's predictions relative to the final percentage of the vote obtained, rather than the ordered ranking after the votes are final. As an example, the aforementioned point system would apply, but its application to the user's prediction may be premised instead based on the user's prediction relative to the candidates' polling numbers relative to the final outcome. In this alternative application, the user would make a prediction relative to whether or not a given candidate will under or over perform in the final vote percentages based on the poll numbers at the time of the prediction.

As an example for the application of the first embodiment, Table 3 shows the results for the 2008 New Hampshire Republican Primary. This proposed point system has been retroactively applied to those actual historical results.

TABLE 3

Actual Results from 2008 New Hampshire Republican Primary

| Ranking | Candidate | Votes | Vote % | Delegates | Potential Points |
|---|---|---|---|---|---|
| 1 | John McCain | 88,713 | 37% | 7 | 19 |
| 2 | Mitt Romney | 75,675 | 32% | 4 | 15 |

TABLE 3-continued

Actual Results from 2008 New Hampshire Republican Primary

| Ranking | Candidate | Votes | Vote % | Delegates | Potential Points |
|---|---|---|---|---|---|
| 3 | Mike Huckabee | 26,916 | 11% | 1 | 5 |
| 4 | Rudy Guiliani | 20,344 | 8% | 0 | 3 |
| 5 | Ron Paul | 18,346 | 8% | 0 | 2 |
| 6 | Fred Thompson | 2,955 | 1% | 0 | 1 |
| 7 | Duncan Hunter | 1,192 | 1% | 0 | 1 |

In the outcome above, John McCain's outcome would result in 19 points awarded to whichever user accurately predicted that he would come in first. These points are apportioned based on a vote total of 88,713 (resulting in 8 points), a vote percentage of 37% (3 points), 7 earned delegates (7 points) and an extra point for accurately predicting the outcome. Similarly, Mitt Romney's assigned points from this outcome would be 15 points, based on his 75,675 votes (7 points), 32% of the vote (3 points), 4 earned delegates (4 points) and a bonus point for accurately predicting the outcome.

As an illustration, and as demonstrated below in Table 4, three separate individuals' outcomes are compared. User A has accurately predicted the final rankings in the 2008 New Hampshire Republican Primary. User B made every pick correctly with the exception of Romney and Huckabee, which were reversed in the final prediction. User C predicted incorrectly in every instance.

TABLE 4

Application of Point System to Results for 2008 New Hampshire Republican Primary

| Rnk | Candidate | Votes | Vote % | Del. | Poten. Points | User A Points | User B Points | User C Points |
|---|---|---|---|---|---|---|---|---|
| 1 | John McCain | 88,713 | 37% | 7 | 19 | 19 | 19 | 0 |
| 2 | Mitt Romney | 75,675 | 32% | 4 | 15 | 15 | 0 | 0 |
| 3 | Mike Huckabee | 26,916 | 11% | 1 | 5 | 5 | 0 | 0 |
| 4 | Rudy Guiliani | 20,344 | 8% | 0 | 3 | 3 | 3 | 0 |
| 5 | Ron Paul | 18,346 | 8% | 0 | 2 | 2 | 2 | 0 |
| 6 | Fred Thompson | 2,955 | 1% | 0 | 1 | 1 | 1 | 0 |
| 7 | Duncan Hunter | 1,192 | 1% | 0 | 1 | 1 | 1 | 0 |
| | | | | Total: | 46 | 46 | 26 | 0 |

The application of this point system, by only awarding points based on the accurate final ranking of the candidates, incentivizes astute predictions relative to the placement of the candidates in each race, not simply the ones at the very top. As demonstrated in Table 3, a simple failure to accurately predict the final outcome for Romney and Huckabee, respectively, resulted in a 20 point swing. Over the course of political election contests in fifty separate states, this will have the potential cumulative effect of wide swings of points over the course of the season.

After each political election contest occurs—whether a primary election, caucus, or nominating convention—the final election outcomes and results are reviewed by the application's administrator. Specifically, the votes, vote percentage, and delegate distribution are reviewed and the candidates are assigned a final ranking and their total points. Once this information is processed, it is then entered into the website's back-end database on the server. Once uploaded, the application's administrator then engages a software process and/or application which compares the users' predictions against the final outcomes of the election contest. Points are then awarded to the user based on their predictions, and added to their cumulative total on a week-by-week basis. From there, the user's point total and prediction percentage is matched up against the other users, and displayed on the user's account page and various leaderboards.

One non-predictive option offered to the users of this application is resources relative to the campaign calendar, as well as the specific states where the primary elections and caucuses occur. In one embodiment, the campaign calendar is presented in the form of an animated timeline, where the respective primaries and caucuses are broken down by the week-by-week structure described in Table 1. Each week presents a map highlighting those particular elections scheduled for that given week, as well as a brief description offered as to the relative importance and significance of those elections in their context on the primary calendar.

Another non-predictive option offered to the users of this application is another resource relating to the states' primary calendar. In one embodiment, a large interactive map is presented to the user. This interactive map allows the user to quickly access information relative to the individual states' primary elections, caucuses, and nominating conventions, specifically: date of the respective state's primary election, caucus, or nominating convention; the scheduled week of the primary for the purposes of the game; whether the primary or caucus is open or closed, and the amount of delegates at stake and the nature of their allocation; and a brief summation of the history of this particular state's primary or caucus election and its relative import. A hyperlink to that particular state's content-specific page would also be provided. For users who may experience technical difficulty with the formatting of this page or are otherwise geographically challenged, an alphabetical hyperlinked list of the states would be made available so that they may access the state-content-specific website.

Another non-predictive option offered to the user is a collection of information that may be of general interest to the users of this online community, specific to the candidates in the race. In one embodiment, a state-specific webpage is presented to the user. This state-specific webpage would provide relevant information and content to the user, as including: form of electoral contest, whether primary election, caucus, or nominating convention; date of the primary or caucus; scheduled week of the election contest for the purposes of the game; whether the primary or caucus is open or closed; the amount of delegates at stake and the nature of their allocation; a brief summation of the history of this particular state's primary election or caucus, and its relative import within the context of the political race and calendar; and recent voting results and population snapshot. In addition, a news feed of relevant and topical stories relating to the election is displayed to the user; social media apparatuses (including Twitter) from local reporters and those knowledgeable about that state's politics; and links to the respective state political party resources that are charged with administering the primary election or caucus.

Another non-predictive option offered to the user is a collection of information that may be of general interest to the users of this online community, specifically collective information relating to the various candidates for these respective elections. In one embodiment, a webpage with the various candidates for office is presented to the user. This summary website would offer visual and textual links relative to these candidates, and would display information regarding their relative polling data and numbers of followers for the various social networking facilities, such as Facebook and Twitter. In addition, this webpage would display additional information relative to these candidates, including but not limited to: comparative polling data relating to these candidates; official press releases and statements issued by the campaigns; a news feed relative to reporting and commentary on the election; recent voting results.

Another non-predictive option offered to the user is a collection of information specific to the candidates in the race that may be of general interest to the users of this online community. In this embodiment, this webpage would collect and display information of a general interest relating to a specific candidate in the race. This candidate specific information would include the candidate's biographical information, such as: official campaign photograph of the candidate, age and date of birth, birthplace, education, experience, and political experience. This portion of the website would also contain direct hyperlinks to the candidate's official biography, any external polling data relating to their campaign, and direct links to various resources and assets made available by the campaign. In addition, this webpage also displays any official news releases by that particular candidate, as well as any affiliated social networking applications, such as a Twitter feed or the candidate's official YouTube channel.

Alternative Embodiments

One of the peculiarities of the presidential election year season is the separation of the various states' presidential preference primaries from the state's general primaries. With a desire to influence the presidential race and garner attention from the presidential candidates, many states have opted to hold separate elections solely for the presidential nomination, far earlier on the calendar than the primary contests they would hold for any congressional, state, or local offices. In a number of cases, some states still host their presidential preference primaries on the same date as their general state primaries. However, most states have separated the two, meaning that many of these states host three separate elections in a calendar year (a presidential preference primary and/or caucus, a general state primary, and the general election). In 2012, the schedule of the presidential preference primaries run from early January to mid-June (See Table 1, "Week-by-Week Organizational Schedule for Presidential Pick'Em League"), as compared to the general state primaries, which run from early March through mid-September (See Table 5, "Week-by-Week Organizational Schedule for Political Pick'Em League," below).

Given the schism between the scheduling these various primaries, as well as the large number of candidates and elections, it is appropriate to fashion a similar game to these general state primaries as the one referenced and contemplated in the first embodiment herein. Every two years, each of the 435 Congressional seats that are up for election, as well as at least 33 Senate seats and approximately 18 governorships. Every one of those offices are technically subject to a nominating process, though the contested nature of them varies widely from seat to seat and is largely dependent upon the popularity of the incumbent, if any exists.

The implementation of this embodiment will mirror in many ways the methods described above. Specifically, it will involve the same operative structure relating to the point distribution as outlined in Table 2 ("Political Pick'Em Point System"), with the exception of the delegate apportionment. This embodiment will follow the various congressional and gubernatorial primaries throughout the country between early March through mid-September, illustrated below in Table 5.

TABLE 5

Week-by-Week Organizational Schedule for Political Pick'Em League Matchups during 2012 General State Primaries

| Week | Dates | States Delegates |
|---|---|---|
| 1 | Mar. 6-12 | Ohio, Texas* |
| 2 | Mar. 13-19 | Alabama*, Mississippi |
| 3 | Mar. 20-26 | Illinois*, |
| 4 | Apr. 3-9 | District of Columbia*, Maryland*, |
| 5 | Apr. 24-30 | Pennsylvania* |
| 6 | May 8-14 | Indiana*, North Carolina, West Virginia |
| 7 | May 15-21 | Idaho*, Nebraska, Oregon*, |
| 8 | May 22-28 | Arkansas*, |
| 9 | Jun. 5-11 | California*, Iowa, Montana, New Jersey, New Mexico, South Dakota* |
| 10 | Jun. 12-18 | Maine, North Dakota, Nevada, South Carolina, Virginia |
| 11 | Jun. 26-Jul. 2 | Colorado, Oklahoma, Utah* |
| 12 | Jul. 31-Aug. 6 | Georgia, Tennessee |
| 13 | Aug. 7-13 | Hawaii, Kansas, Michigan, Missouri, Washington |
| 14 | Aug. 14-20 | Connecticut, Florida, Minnesota, |
| 15 | Aug. 21-27 | Wyoming |
| 16 | Aug. 28-Sep. 3 | Alaska, Arizona, Vermont |
| 17 | Sep. 11-17 | Delaware, New Hampshire, New York, Rhode Island, Wisconsin |
| 18 | Sep. 18-24 | Massachusetts |

*Designates states that hold both the presidential and state primaries on the same date Because of the more structured nature of the races scheduled in these states, one particular application of this embodiment may allow for the use of a traditional "head-to-head" system for facilitating increased competition between the users. Specifically, since the competitive uncertainty in later races is mitigated, a head-to-head and/or playoff system may be possible in this embodiment.

As the "Political Pick'Em Point System" (outlined in Table 2) is applicable to both the presidential primary elections and caucuses in the first embodiment as well as the general state primaries as outlined in an alternative embodiment, this same operative methodology and point structure may be applied for the general elections that occur in November. Given the multitude of federal, state, and local offices up for election, this political predictive methodology and system may be employed on a large, expansive scale to these races across the country.

CONCLUSION, RAMIFICATIONS, AND SCOPE

Accordingly, the reviewer will see that this application sufficiently encompasses an objective point system, structures the disparate and infrequent actual political election contests within an orderly week-by-week structure, and applies engaging competitive match ups between the users. In sum, it distills the political election results into a framework whereby the users will be as engaged in following the American political process as they are, hopefully, with their respective fantasy football or rotisserie baseball teams, which will be of considerable benefit to our society as a whole.

The invention claimed is:

1. A method for providing online political prediction-based games, comprising:
a participant terminal having a user interface that is interactive with a browser or Internet access to communicate online; and
a server communicating online with the participant terminal, wherein the server provides the participant terminal with a user identification system that enables access to an online community, offers an interactive selection of political election contests to a user by displaying potential selections to the user on the participant terminal, enables the user to make predictions relative to political election contests for a given election season;
assigns points relative to any votes, vote percentage, and delegates earned by candidates participating in the political election contests, including bonus points for a win or loss, and; recognizes users according to their points accumulated in predicting political election contests, and ranks them accordingly.

2. The method of claim 1, further comprising a host server with a front-end website for managing a user identification system and tracking various users' cumulative points earned, accuracy of the user, and performance.

3. The method of claim 2, further providing a user identification system that allows the user to designate various their user-specific characteristics, including but not limited to user name, team name, team avatar image, home state, political affiliation, preferred candidate, and which candidate the user believes will win their party's nomination and which candidate will win the general election.

4. The method of claim 1, wherein political election contests are based on actual election events, including primary elections, caucuses, nominating conventions, and general elections, which are scheduled and held for presidential, congressional, state and local offices, and wherein a series of elections in a calendar year leading up to the general election in November starting with the nomination phase and ending with the general election is an election season.

5. The method of claim 4, organizing the political election contests within a week-by-week structure.

6. The method in claim 1, wherein the votes, vote percentage, and delegates earned by the candidates in a political election contest are assigned points based on an established point system.

7. The method in claim 1, wherein the accuracy of the user is compared to the actual results of the political election contests.

8. The method in claim 7, wherein the server program or web application applies the user's predictions and awards the user points based on the accuracy of the user, which are then tabulated.

9. The method in claim 8, wherein the server calculates and displays the users relative to the accuracy of the user according to the assigned points awarded and accuracy.

10. The method in claim 9, comparing the cumulative point totals and accuracy of the user against other users of the online community.

11. The method in claim 10, wherein the server further provides the user with statistical data relating to the accuracy of the user as compared to the political election contest and other users.

12. A system for providing online political prediction-based games, comprising:
a participant terminal having a user interface that is interactive with a browser or Internet access to communicate online; and
a server communicating online with the participant terminal, wherein the server provides the participant terminal with a user identification system that enables access to an online community, offers an interactive selection of political election contests to a user by displaying potential selections to the user on the participant terminal, enables the user to make predictions relative to political election contests for a given election season;
assigns points relative to any votes, vote percentage, and delegates earned by candidates participating in the political election contests, including bonus points for a win or loss, and; recognizes users according to their points accumulated in predicting political election contests, and ranks them accordingly.

13. The system of claim 12, further comprising a host server with a front-end website for managing a user identification system and tracking various users' cumulative points earned, accuracy of the user, and performance.

14. The system of claim 12, further providing a user identification system that allows the user to designate various their user-specific characteristics, including but not limited to user name, team name, team avatar image, home state, political affiliation, preferred candidate, and which candidate the user believes will win their party's nomination and which candidate will win the general election.

15. The system of claim 12, wherein political election contests are based on actual election events, including primary elections, caucuses, nominating conventions, and general elections, which are scheduled and held for presidential, congressional, state and local offices, and wherein a series of elections in a calendar year leading up to the general election in November starting with the nomination phase and ending with the general election is an election season.

16. The system of claim 15, wherein said organizing the political election contests within a week-by-week structure.

17. The system in claim 12, wherein the votes, vote percentage, and delegates earned by the candidates in a political election contest are assigned points based on an established point system.

18. The system in claim 12, wherein the accuracy of the user is compared to the actual results of the political election contests.

19. The system in claim 18, wherein the server program or web application applies the user's predictions and awards the user points based on the accuracy of the user, which are then tabulated.

20. The system in claim 19, wherein the server calculates and displays the users relative to the accuracy of the user according to the assigned points awarded and accuracy.

21. The system in claim 20, comparing the cumulative point totals and accuracy of the user against other users of the online community.

22. The system in claim 21, wherein the server further provides the user with statistical data relating to the accuracy of the user as compared to the political election contest and other users.

* * * * *